United States Patent
Jeon et al.

(10) Patent No.: US 8,540,862 B2
(45) Date of Patent: Sep. 24, 2013

(54) METHOD OF MANUFACTURING LATERALLY GRADED POROUS SILICON OPTICAL FILTER THROUGH DIFFUSION-LIMITED ETCHING AND FILTER STRUCTURE MANUFACTURED THEREBY

(75) Inventors: Heon Su Jeon, Gunpo-si (KR); Kyung Wook Hwang, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1055 days.

(21) Appl. No.: 12/192,199

(22) Filed: Aug. 15, 2008

(65) Prior Publication Data

US 2009/0087143 A1    Apr. 2, 2009

(30) Foreign Application Priority Data

Sep. 28, 2007    (KR) .................... 10-2007-0097812

(51) Int. Cl.
    C25F 3/12    (2006.01)
(52) U.S. Cl.
    USPC ............................... 205/666; 205/667
(58) Field of Classification Search
    USPC .................................. 205/666, 667
    See application file for complete search history.

(56) References Cited

U.S. PATENT DOCUMENTS

| | | | |
|---|---|---|---|
| 6,398,943 B1 * | 6/2002 | Arens-Fischer et al. | 205/666 |
| 6,726,815 B1 * | 4/2004 | Artmann et al. | 204/267 |
| 2001/0010701 A1 * | 8/2001 | Furushima | 372/50 |
| 2004/0126072 A1 * | 7/2004 | Hoon Lee et al. | 385/122 |
| 2006/0285797 A1 * | 12/2006 | Little | 385/43 |

OTHER PUBLICATIONS

Kyungwook Hwang et al., Laterally graded porous silicon optical filter fabricated by diffusion-limited etch process, Applied Optics, vol. 47, No. 10, Apr. 1, 2008 p. 1628-1631.

L.T. Canham, Silicon quantum wire array fabrication by electro-chemical and chemical dissolution of waters, Applied Physics Letters 57, Sep. 3 1990, p. 1046-1048.

Yu-Sik Kim et al., Semiconductor Microlenses Fabricated by One-Step Wet Etching, IEEE Photonics Technology Letters. vol. 12 No. 5 May 2000, p. 507-509.

Hyejin Kim et al., Optical microscope imaging of semiconductor quantum wells, Semiconductor Science and Technology Iss. 16, Mar. 2001 p. L24-L27.

Yeonsang Park et al., Design, Fabrication and Micro-Reflectance measurement of a GaAs/AlAs-Oxide Antireflection Film, Journal of the Korean Physical Society, vol. 40, No. 2 Feb. 2002 p. 245-249.

D. Hunkel et al., Integrated photometer with porous silicon interference filters, Materials Science and Engineering, B69-70, 2000, p. 100-103.

(Continued)

*Primary Examiner* — Nicholas A Smith
(74) *Attorney, Agent, or Firm* — Sughrue Mion, PLLC (57) ABSTRACT

Disclosed herein is a method of manufacturing a laterally graded porous silicon optical filter through diffusion-limited etching. The change in resonance frequency of the porous silicon layer in a taper axis direction is adjusted using the diffusion of reactive ions in an etchant under conditions of use of a related etch mask pattern. It is possible to manufacture an optical band-pass filter having a resonance frequency that linearly changes using a tapered etch window opening.

8 Claims, 10 Drawing Sheets

(56) References Cited

OTHER PUBLICATIONS

Jia-Chuan Lin et al., Manufacturing method for n-type porous silicon based on hall effect without illumination, Applied Physics Letters, vol. 89, Sep. 2006, p. 121119-1-121119-3.

S. Iiyas et al., Gradient refractive index planar microlens in Si using porous silicon, Applied Physics Letters 89, Nov. 2006, p. 211123-1211123-3.

Sean E. Foss et al., Laterally Graded Rugate Filters in Porous Silicon, Materials Research Society Symposium, vol. 797 2004, p. W1.6.1-W1.6.6.

H.G. Bohn et al., Wedge-shaped layers from porous silicon: the basis of laterally graded interference filters, Phys. Stat. Sol. No. 8, p. 1437-1442, May 2005.

D. Hunkel et al., Interference filters from porous silicon with laterally varying wavelength of reflection, Journal of Luminescence 80, 1999 p. 133-136.

P. Ferrand et al., Optical losses in porous silicon waveguides in the near-infrared: Effects of scattering, Applied Physics Letters vol. 77 No. 22, Nov. 2000, p. 3535-3537.

L Pavesi et al., Random porous silicon multilayers: application to distributed bragg reflectors and interferential fabry-perot filters, Semiconductor Science and Technology Iss. 12, 1997 p. 570-575.

C. Mazzoleni et al., Application to optical components of dieletric porous silicon multilayers, , Applied Physics Letters 67 Nov. 1995, p. 2983-2985.

* cited by examiner

SiN etch mask

Mask opening (porous silicon)

METHOD OF MANUFACTURING LATERALLY GRADED POROUS SILICON OPTICAL FILTER THROUGH DIFFUSION-LIMITED ETCHING AND FILTER STRUCTURE MANUFACTURED THEREBY

CROSS-REFERENCE TO RELATED APPLICATION

This non-provisional application claims priority under U.S.C. §119 from Korean Patent Application No. 10-2007-0097812, filed on Sep. 28, 2007, the entire contents of which are incorporated herein in their entirety by reference.

BACKGROUND

1. Field of the Invention

Methods and apparatuses consistent with the present invention relate to manufacturing a laterally graded porous silicon optical filter, particularly, to a method of manufacturing a porous silicon film having a lateral etch-depth gradient through diffusion-limited etching (DLE), and more particularly, to a method of manufacturing an optical filter, in which etching through diffusion control using a porous silicon etch bath is carried out with the use of a mask having a tapered window opening, so that the resonance frequency changes in a taper axis direction.

2. Description of the Related Art

Typically, porous silicon (PSi) has continuously received attention in the field of photonics since it was first discovered. This attention is being paid to PSi because of the light emitting properties thereof, but properties and characteristics essential for manufacturing passive photonic devices having high functionality, such as optical mirrors, Fabry-Perot filters, and waveguides, should be considered.

The application of PSi to passive devices advantageously results in in-situ control of optical parameters thereof. In the course of forming PSi through anodic etching, a refractive index n may be adjusted depending on the changes in current density, whereas a physical thickness d is directly adjusted by an etching duration time. The optical thickness (OT) of a thin film, which is an important parameter for designing an optical structure, may be easily adjusted during the etching process. Further, it appears that the gradual change of OT in a spatial region is useful in the formation of passive photonic devices using PSi.

The vertical control of OT may be easily achieved, depending on the changes in etch current and/or duration time, but lateral gradation is not easy. In order to create the lateral gradation in the PSi layers, various methods have been developed to date, including the use of an in-plane electric field.

In addition, circular anodic metal is used to form a gradient index lens (GRIN lens).

The common point of the above methods is that the lateral gradation of the film properties is determined by a hole current distribution in a wafer.

SUMMARY

Exemplary embodiments of the present invention provide a method of manufacturing a laterally graded PSi optical filter through DLE, comprising forming an etch mask and conducting anodic etching in a PSi etch bath. The etch mask has a tapered etch window opening, the width of which is gradually decreased from one end toward the other end along the axis of the etch window opening, and the tapered etch window opening may be shaped as illustrated in FIGS. 5 to 8.

Exemplary embodiments also provide a laterally graded PSi optical filter structure, obtained through DLE.

BRIEF DESCRIPTION OF THE DRAWINGS

Exemplary embodiments will be more clearly understood from the following detailed description, taken in conjunction with the accompanying drawings, in which.

DETAILED DESCRIPTION OF EXEMPLARY EMBODIMENTS

Hereinafter, a detailed description will be given of exemplary embodiments with reference to the accompanying drawings.

In accordance with an embodiment, a method of manufacturing a laterally graded PSi optical filter is provided, which comprises forming an etch mask and conducting anodic etching in a PSi etch bath.

In the above method, etching through diffusion control using the PSi etch bath may be conducted with the use of a mask having a tapered window opening, so that the resonance frequency of the optical filter changes in a taper axis direction.

The etch mask may have a tapered etch window opening, the width of which is gradually decreased from one end toward the other end along the axis of the etching window opening, and the tapered etch window opening may be shaped as seen in FIGS. 5 to 8.

According to the example embodiments, the method of manufacturing an anodically etched PSi layer having optical properties having a lateral etch-depth gradient is provided. The lateral gradation of the etch depth of the PSi layer is adjusted by a related etch mask pattern. Unlike other methods which depend on non-uniform hole current distribution, the method according to the example embodiments utilizes diffusion of reactive ions in an etchant. Thereby, it is possible to manufacture an optical band-pass filter, the resonance frequency of which linearly changes, using a tapered etch window opening. The optical filter has a wavelength tuning range of 10~100 nm, a transmission bandwidth of 1~10 nm, and a center wavelength ranging from 400 nm to 2000 nm.

The method of forming the PSi thin film, in which etchant ions (F— ion) are diffused in a lateral direction, is newly introduced. The method does not require specific etching devices or methods, and, in an exemplary embodiment, photolithographic patterning precede PSi etching. Based on DLE, the total etching properties are determined by a procedure of supplying etching species to a reaction front through very slow physical diffusion because a chemical reaction rapidly occurs at the etchant/sample interface. Thus, the spatial variation in etch rate (i.e., etching profile) is strongly dependent on detailed etch mask geometry.

In this regard, conventionally, a DLE process was employed to vertically cut InGaAs/GaAs multiple quantum wells at a very small angle, which enables the observation of quantum well layers on the nanometer scale using an optical microscope. Further, through a single DLE process using a circular mask opening, GaAs microlenses were fabricated. PSi etching was conducted in a contact-metal-free etch bath.

Figure 1A:
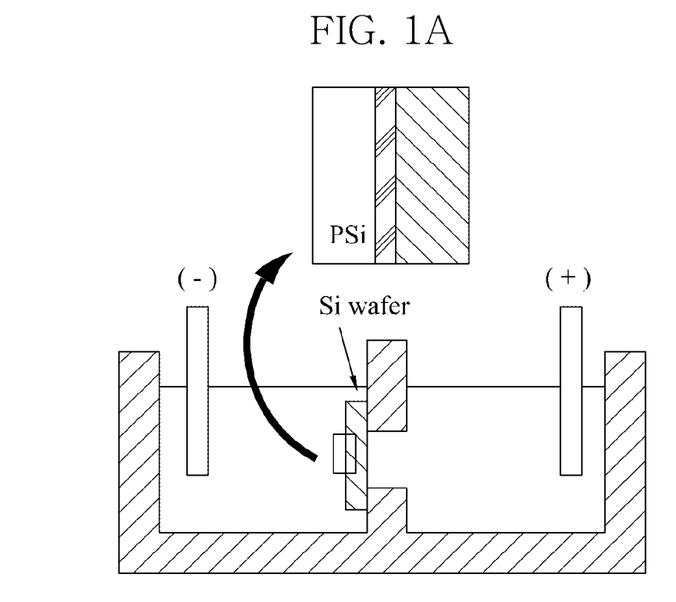
FIG. 1A shows a schematic diagram of a PSi bath.

FIG. 1A schematically shows the PSi etch bath. The etch bath includes two chambers, that is, an etch chamber (anode) and a buffer chamber (cathode). These two chambers are electrically insulated from each other by a Si wafer. In the course of anodic etching, a PSi layer is formed at the anode side of the Si wafer, that is, on the surface opposite the etch chamber. This two-chamber construction requires no metallization on the back surface of the wafer. In the example embodiments, a p-type (0.005 Ωcm) Si wafer doped with boron having <100> orientation is used. The etchant is an HF-based electrolyte, for example, a mixture of HF, $C_2H_5OH$, and $H_2O$ at a volume ratio of 1:1:1. The entire etching process is controlled by a computer program using the high precision current source.

Before anodic etching, a SiN film having a predetermined thickness, for example, 500 nm, is deposited through chemical vapor deposition at low pressure, and is then patterned through typical lithography and reactive ion etching. The SiN layer is highly resistant to the HF-based etchant, and is thus used as an etch mask during the etching process. The SiN etch mask includes an array of tapered window openings. As long as the mask is resistant to the etchant during the PSi etching, it is evident that the etch mask is not limited only to the SiN layer.

Figure 1B:
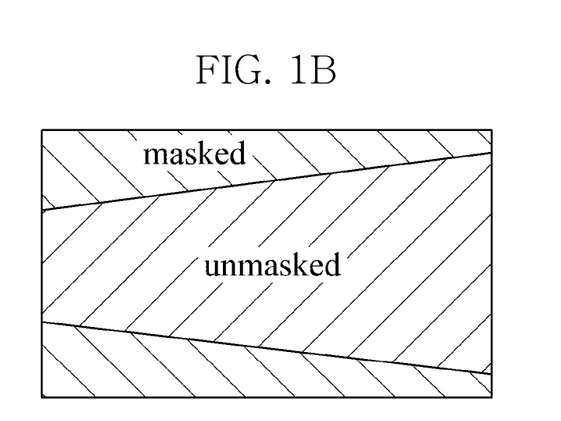
FIG. 1B shows a tapered etch mask pattern on a Si wafer.

As is schematically shown in FIG. 1B, the window opening has a width (ranging from 2.5 mm to 3.5 mm relative to a length of 8 mm), which changes linearly. The etch mask includes a tapered etch window opening, the width of which is gradually decreased from one end toward the other end along the axis of the etch window opening. Although the mask opening may be formed to be smaller, in the example embodiments, relatively larger window openings are adopted, so that the optical properties of the PSi layer are changed sufficiently slow to fabricate macroscopic photonic devices. The PSi layer thus obtained has gradual changes in OT in the long axis direction along the taper axis, as expected.

Figure 5:
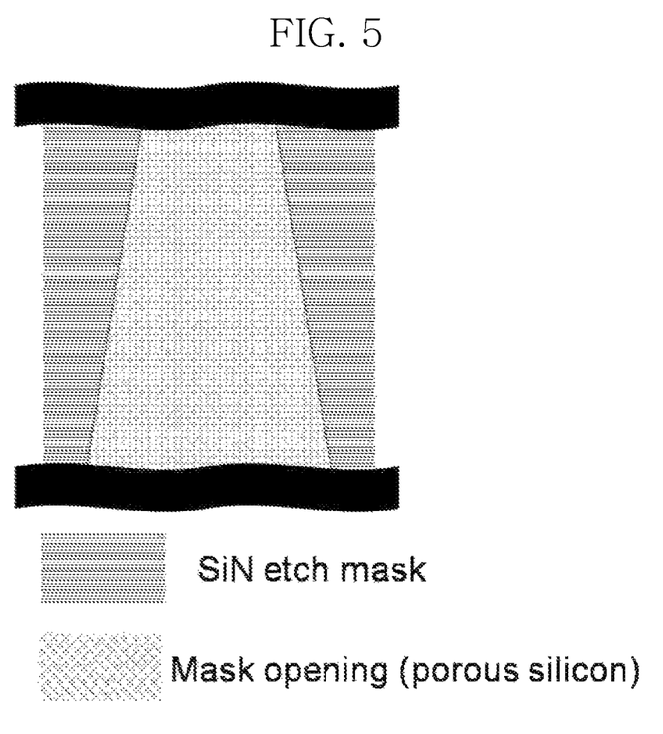
FIGS. 5 to 8 show various geometric shapes of the tapered etch mask pattern.
Figure 6:
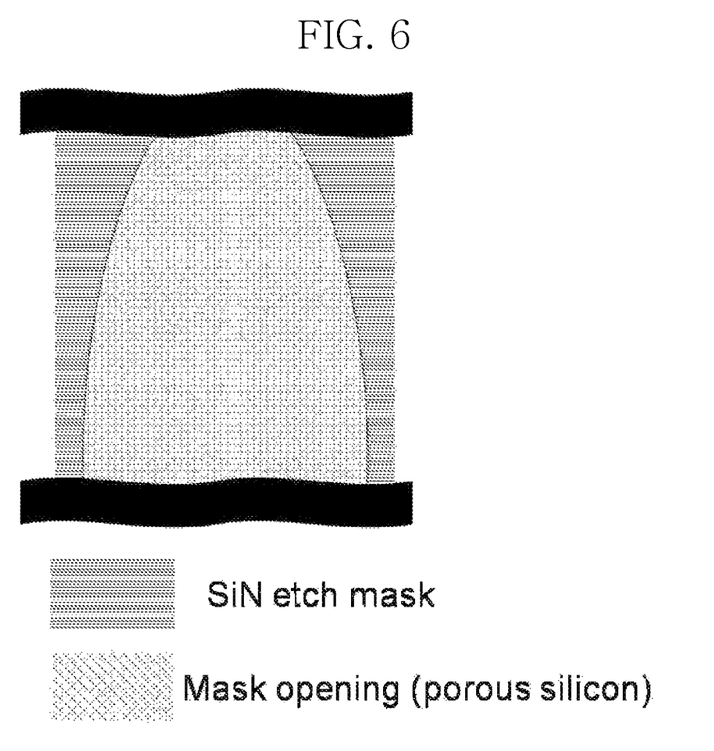
Figure 7:
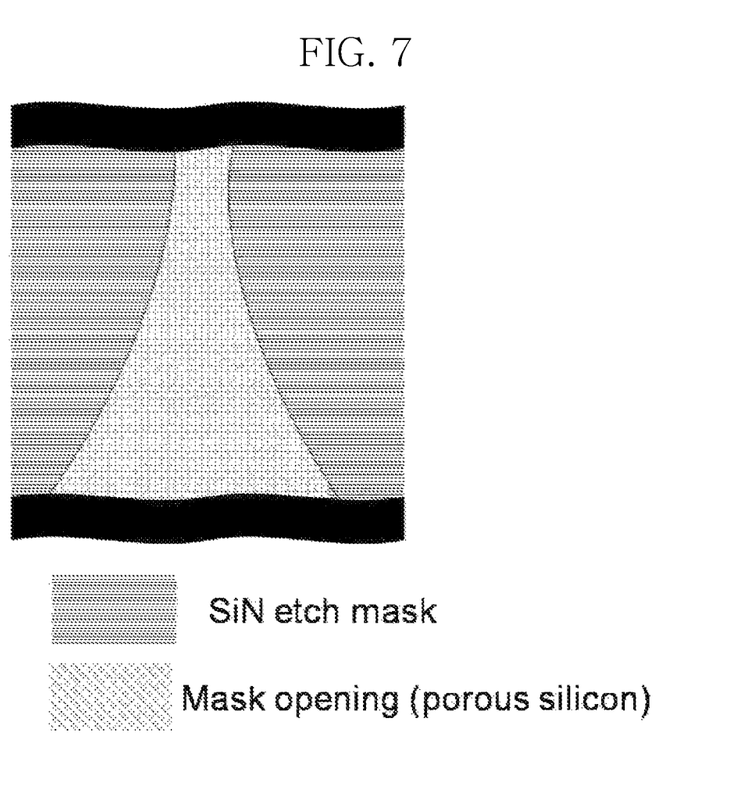

FIGS. 5 to 8 show various geometric shapes of the tapered etch window opening. As seen in FIGS. 5 to 7, the etch window opening has a tapered shape, the width of which is gradually decreased from one end toward the other end along the axis of the etch window opening. That is, the etch window opening has a tapered shape, which extends sufficiently in an tapered direction thereof, such that it has a predetermined degree of taper between both ends thereof as shown in a wave pattern in FIGS. 5 to 7. In FIG. 5, each of both lateral sides of the tapered shape of the etch window opening is formed linearly. In FIG. 6, each of both lateral sides of the tapered shape of the etch window opening is formed to be outwardly parabolic. In FIG. 7, each of both lateral sides of the tapered shape of the etch window opening is formed to be inwardly parabolic. Thus, because the tapered etch window opening is formed to sufficiently extend in the axial direction thereof, the etch window opening having a predetermined area may be appropriately selected, thus making it possible to control the change in the resonance frequency of the PSi layer in the taper axis direction.

Figure 8:
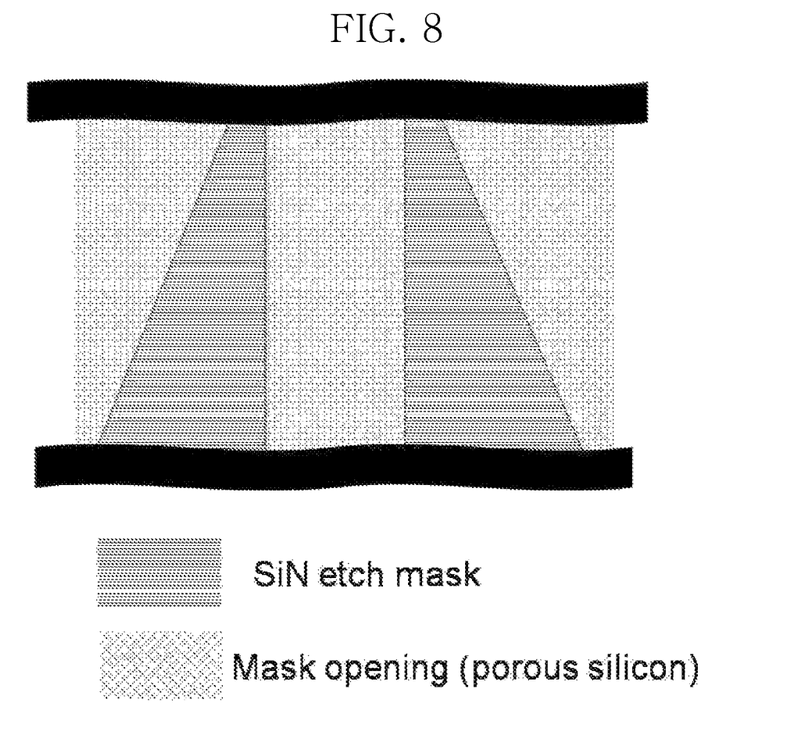

FIG. 8 illustrates the etch mask having a tapered shape. As seen in the drawing, the etch mask comprises a pair of symmetrical tapered parts extending sufficiently in an axial direction, in which the pair of tapered parts is configured such that inner lateral sides of the pair of tapered parts, which face each other, are linearly extended parallel to each other while outer lateral sides of the pair of tapered parts are tapered. In this case, even if the etch window opening between the symmetrical tapered parts of the etch mask has the constant width, due to the effect of the PSi layer formed by the etch portion having a tapered shape outside the etch mask, the PSi layer, formed by the etch window opening having the constant width between the symmetrical tapered parts of the etch mask, has the resonance frequency changing in the axial direction thereof.

The tapered etch window opening may have various modifications without limitation, through which the change in resonance frequency of the PSi layer in the taper axis direction may be adjusted.

Figure 1C:
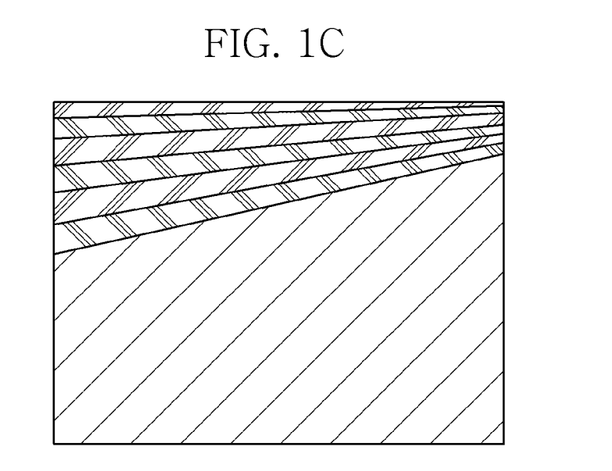
FIG. 1C shows the resultant laterally graded PSi etch profile.

FIG. 1C shows an etch profile of the cross-section of a plurality of PSi layers in the taper axis direction. As a result of the successful application of the etching process proposed above, an optical band-pass filter, being operable in the optical communication wavelength range near 1550 nm and having a resonance frequency that linearly changes, is manufactured. During the manufacture of the filter, the etch current is adjusted in a binary format (current density 2 or 50 $mA/cm^2$) such that only two types of PSi layer are present in the filter structure. Before the manufacture of the filter, two PSi layers are separately formed, and thus the effective refractive index and etch rate thereof are determined using reflectance spectra and spectroscopic ellipsometric data. The refractive indexes of a high refractive index layer and a low refractive index layer are measured to be $n_H=2.0$ and $n_L=1.3$, respectively. The filter is manufactured under the control of etch current and duration time according to a predetermined procedure.

The filter structure is composed of distributed Bragg reflectors (DBRs) including eight upper and lower pairs of layers having a thickness of $\lambda/4$ and a central spacer layer having a thickness of $\lambda/2$ and disposed therebetween. The spacer layer may be formed in the same manner as the high refractive index layer in the DBRs.

Below, the test example of the example embodiments is described, but is not construed to limit the scope thereof.

TEST EXAMPLE

Figure 2A:
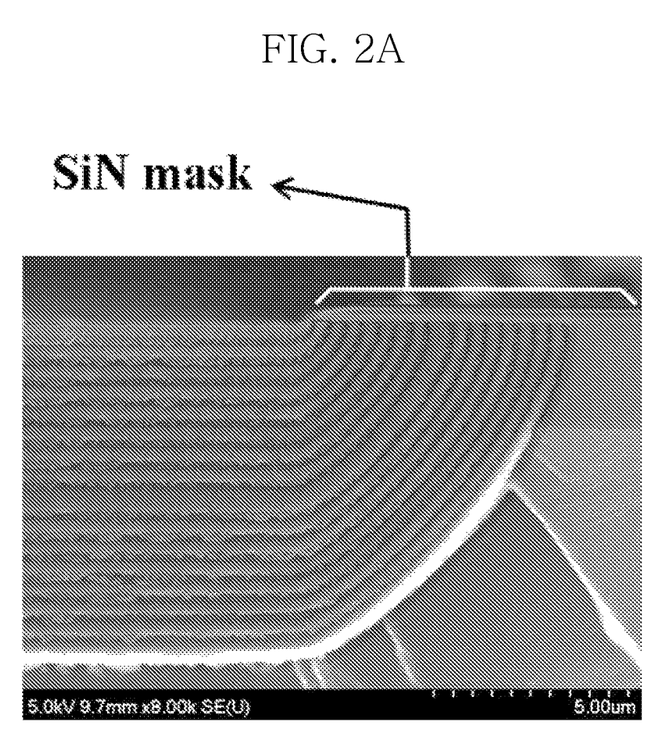
FIG. 2A shows a scanning electron micrograph (SEM) image of a PSi optical filter structure (near the end of a SiN etch mask)
Figure 2B:
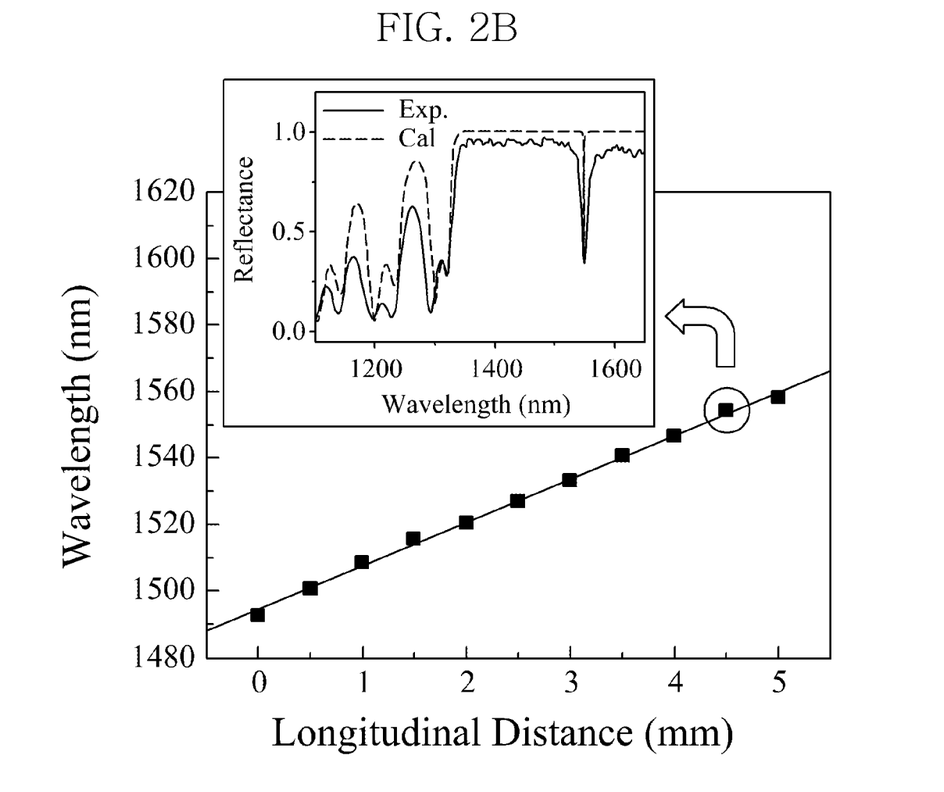
FIG. 2B shows the resonance wavelength of the PSi optical filter as a function of the position along the taper axis.

FIG. 2A is an SEM image of the manufactured optical filter (in particular, the end of a mask for a detailed layer structure) of the optical filter. For rapid diagnosis of the optical filter, reflectance spectra were measured at various positions along the taper axis. In the example embodiments, an optical fiber-based micro reflectance meter was used, and the cut end of the multimode optical fiber was located close to the sample. The radiation of white light and the collection of an output signal reflected from the sample were carried out using the end of the same optical fiber. Thus, from the measurement values, the spatial resolution was limited by the diameter of the optical fiber core ~100 μm. The relationship between the resonance wavelength and the probed position in a long axis along the taper axis is shown in FIG. 2B. As is apparent from this drawing, as the probed position is moved in the longitudinal direction of a narrow mask opening, the resonance wavelength is monotonically increased. The resonance wavelength has a sufficient tuning range greatly exceeding 60 nm. The typical reflectance spectrum measured at one position of the taper axis is inserted in the drawing. The measured spectrum showing the well-defined cavity resonance mode matches the simulation results. The simulation was conducted using a transfer matrix method under conditions of $d_H$=192 nm and $d_L$=295 nm in DBR layer thickness. That is, it was postulated that the lateral gradation of OT was caused by layer thickness variation and that the lateral gradation of refractive index was small enough to ignore.

In order to evaluate the practical use of the manufactured optical filter, the filter was separated from a bulky Si wafer, after which transmittance spectrum was measured. The separation of the thin film optical filter was conducted under instantaneous flow of high density current (~250 mA/cm2). Then, the separated film was attached to a transparent glass substrate using van der Waals force.

Figure 3A:
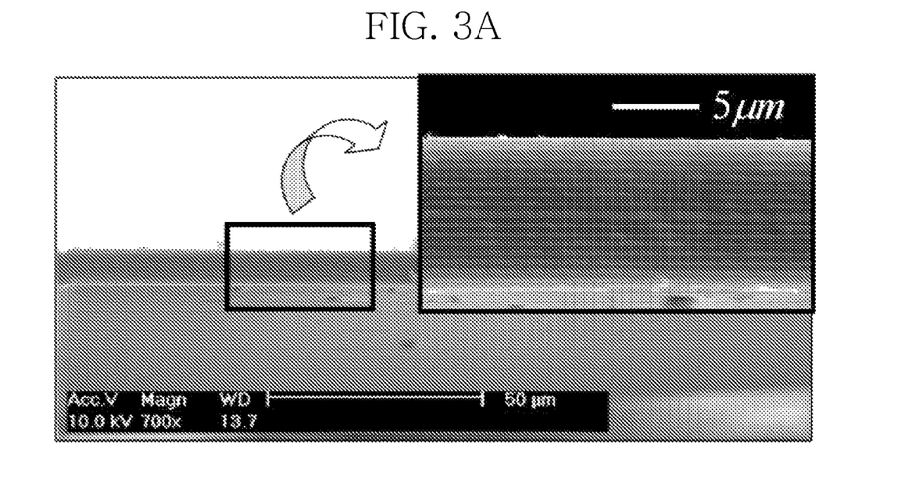
FIG. 3A shows an SEM image of the PSi optical filter film manufactured after being separated from a Si wafer.
Figure 3B:
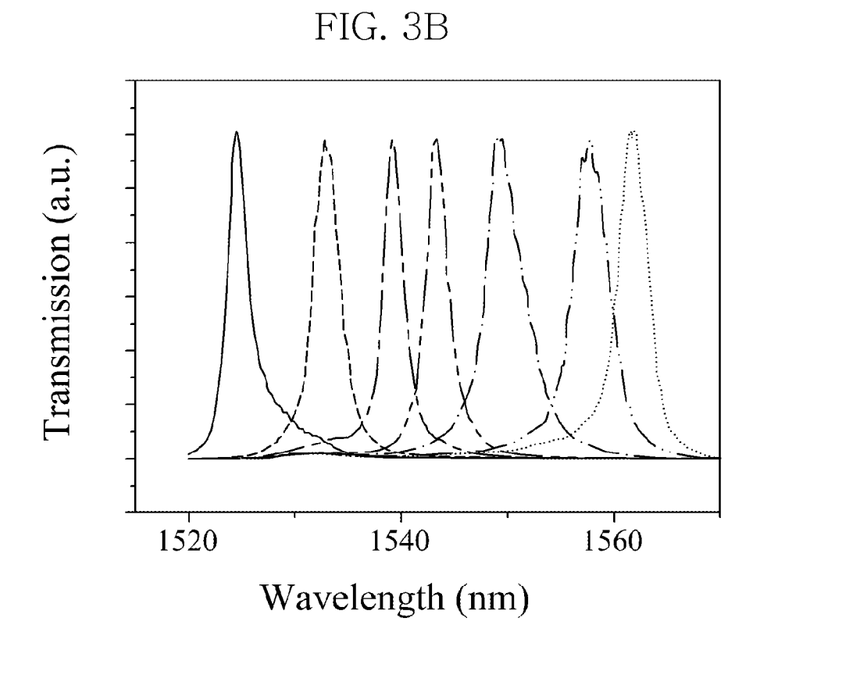
FIG. 3B shows the transmission spectra measured at different positions along the taper axis.

FIG. 3A is an SEM of the PSi thin film optical filter before it is attached to the glass substrate. In the measurement of transmittance spectrum, an amplified spontaneous emission source was used. As seen in FIG. 3B, the resonance transmission peak is monotonically shifted as the probe is scanned in the long axis direction, whereas the width of the resonance line is uniformly maintained at ~3 nm. The basis of the lateral gradation of the PSi layer, etched through the tapered window opening, is mentioned below. In all of the earlier literature for the PSi layer related to the lateral gradation of the etch depth, the results thereof were attributed to spatially non-uniform hole injection. The non-uniform hole current distribution takes place in the experiment according to the example embodiments, but occurs only in the direction across the taper axis, and does not take place in the long axis direction along the taper axis. More specifically, using a commercial simulator (ATLAS, Silvaco Corp., USA), the hole current distribution regarding tapered etch window geometry was calculated.

Figure 4A:
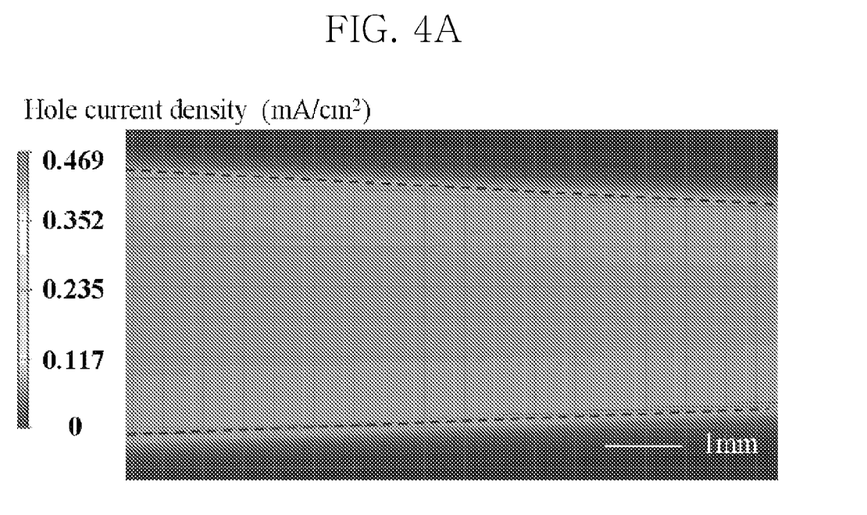
FIG. 4A shows a hole current profile simulated using a tapered electrode.
Figure 4B:
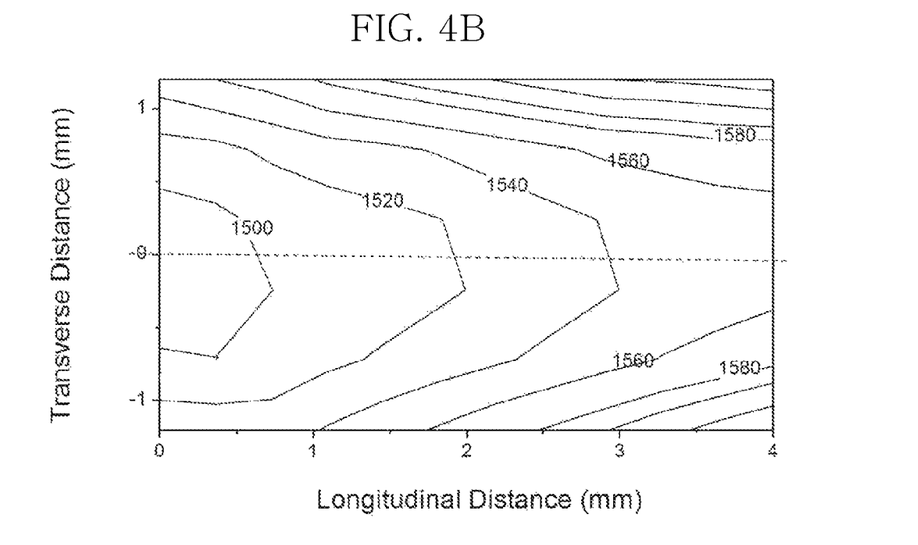
FIG. 4B is a two-dimensional resonance wavelength distribution measured along the tapered etch window opening of the optical filter.

As is apparent from FIG. 4A, the hole current is almost uniform over the entire area of the tapered window opening, with the exception of the vicinity of the end of the mask. Hence, such simulation results eliminate the probability in which the non-uniform hole injection is the cause of a graded etch profile, in which the etch depth varies along the taper axis. For comparison, the two-dimensional map of the resonance wavelength measured from the reflectance of the optical filter is shown in FIG. 4B, which is different from the simulation results. The measured resonance wavelength has a long-range order gradation along the taper axis. Thus, the slow change in resonance frequency in the long axis direction is considered to be due to the DLE factor upon the PSi etching.

As described above, a novel method for manufacturing a PSi thin film having properties varying gradually in a lateral direction through a DLE process is provided. In order to demonstrate the concept and applicability of the method, an optical band-pass filter, which is operable in the optical communication wavelength range and has a resonance frequency that linearly changes, is manufactured. The optical filter is separated from a wafer and is then attached again to a glass substrate, thus completing a PSi optical filter thin film exhibiting a narrow passbandwidth (Δλ=3 nm) with a wide tuning range of 60 m. The band width and tuning range of the optical filter may be further improved by optimizing the tapered mask pattern.

According to the example embodiments, lateral gradation of a PSi layer is controlled using the diffusion of reactive ions in an etchant under conditions of use of a related etch mask pattern. Thereby, it is possible to manufacture an optical band-pass filter, the resonance frequency of which linearly changes, using a tapered etch window opening. The optical filter has, in the center wavelength range of λ=1550 nm, a narrow passbandwidth of ~3 nm, and a tuning range of ~60 nm.

Although example embodiments have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a laterally graded porous silicon optical filter, the method comprising:
    forming an etch mask;
    conducting diffusion limited etching in a two-chambered porous silicon etch bath; and
    adjusting a lateral gradation of an etch depth by a pattern of the etch mask and diffusion of reactive ions in an etchant.

2. The method of claim 1, wherein the etch mask has a tapered etch window opening, a width of which is gradually decreased from one end toward the other end along an axis of the tapered etch window opening.

3. The method of claim 2, wherein the tapered etch window opening includes a tapered shape, which extends in an axial direction thereof, such that the tapered etch window opening has a predetermined degree of taper between both ends thereof, and each of both lateral sides of the tapered shape is formed linearly.

4. The method of claim 2, wherein the tapered etch window opening has a tapered shape, which extends in an axial direction thereof, such that the tapered etch window opening has a predetermined degree of taper between both ends thereof, and each of both lateral sides of the tapered shape is formed to be outwardly parabolic.

5. The method of claim 2, wherein the tapered etch window opening has a tapered shape, which extends in an axial direction thereof, such that the tapered etch window opening has a predetermined degree of taper between both ends thereof, and each of both lateral sides of the tapered shape is formed to be inwardly parabolic.

6. The method of claim 2, wherein the etch mask comprises a pair of symmetrical tapered parts which extend in an axial direction, in which the pair of symmetrical tapered parts is configured such that inner lateral sides of the pair of symmetrical tapered parts, which face each other, linearly extend parallel to each other while outer lateral sides of the pair of symmetrical tapered parts are tapered.

7. The method of claim 1, wherein the conducting the diffusion limited etching comprises diffusing etchant ions in a lateral direction.

8. The method of claim 1, wherein the etch mask comprises a tapered etch window opening,
    wherein a width of the tapered etch window opening gradually decreases from a first end to a second end disposed opposite to the first end along a length-wise axis direction of the tapered etch window opening substantially perpendicular to the width of the tapered etch widow opening,
    wherein the tapered etch window opening controls a change in a resonance frequency of the laterally graded porous silicon optical filter in the length-wise axis direction of the tapered etch window opening.

* * * * *